United States Patent Office 3,578,575
Patented May 11, 1971

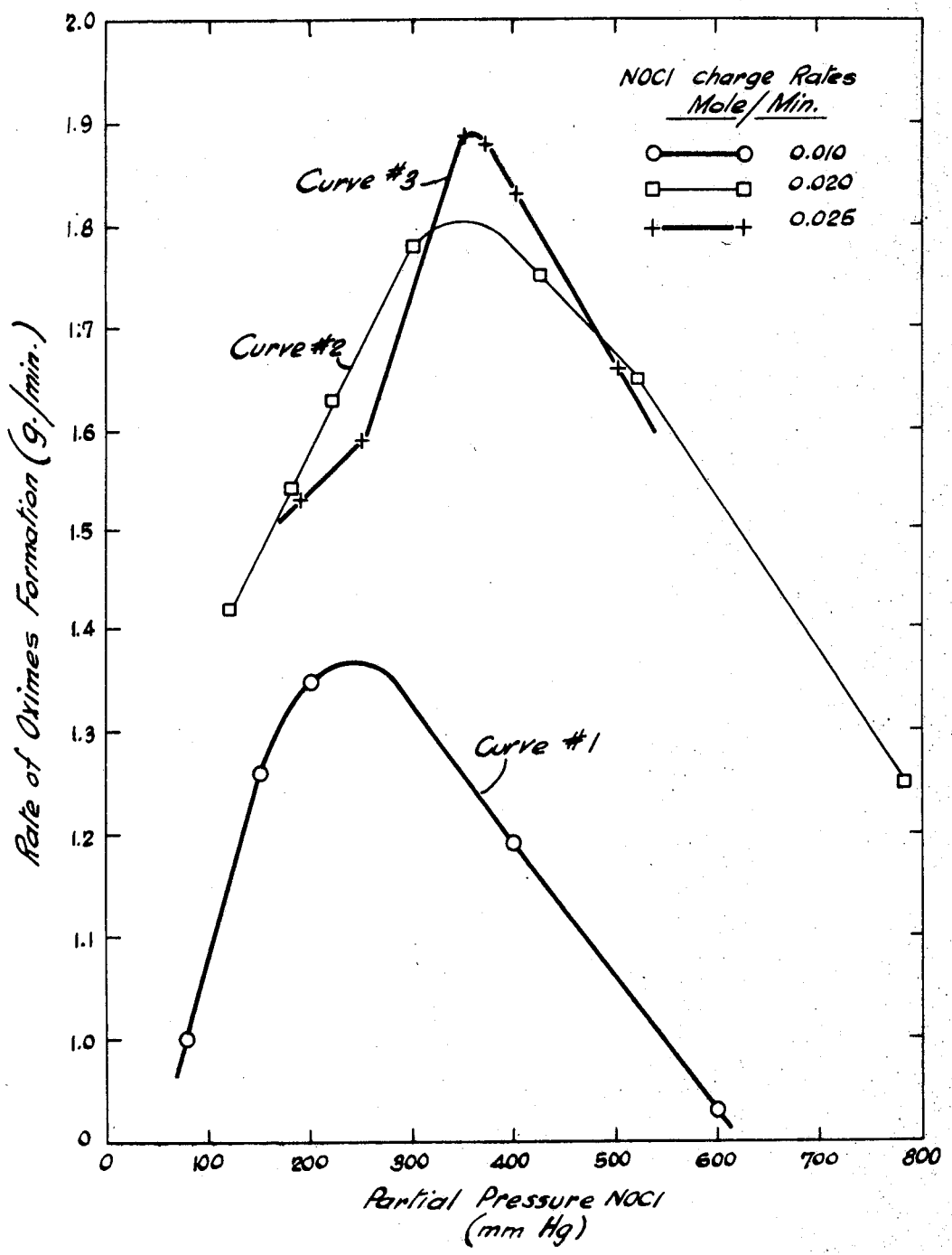

3,578,575
PHOTONITROSATION OF NORMAL PARAFFINS
Orville W. Rigdon, Groves, and Robert S. Edwards and Edward H. Holst, Nederland, Tex., assignors to Texaco Inc., New York, N.Y.
Filed Oct. 11, 1967, Ser. No. 674,612
Int. Cl. B01j 1/00; C07c 131/00
U.S. Cl. 204—162          12 Claims

ABSTRACT OF THE DISCLOSURE

A process for producing normal paraffin oximes and, in particular, normal paraffin oximes having from 10 to 13 carbon atoms wherein a $C_{10}$ to $C_{13}$ normal paraffin is photochemically reacted with a gaseous nitrosating agent, the nitrosating agent partial pressure being at least 125 mm. Hg and the photolytic reaction conducted under the influence of light excluding wave-lengths below 200 millimicrons. The process is admirably suited for the production of normal paraffin oximes from mixtures of $C_{10}$ to $C_{13}$ normal paraffins.

---

This invention relates to a process for producing oximes. In particular this invention relates to the maunfacture of high molecular weight oximes by photochemically reacting a higher molecular weight normal paraffin and a nitrosation agent.

The preparation of low molecular weight cycloaliphatic oximes by photonitrosating cycloalkanes is known and disclosed in U.S. Pats. 3,129,155; 3,309,298 and Reissue Pat. 25,937. Substituting higher molecular weight normal paraffins, that is, normal paraffins having from 10 to 13 carbon atoms in the above known procedures, resulted substantially in the formation of ketones or amides. Continued investigation into the applicability of these procedures when photonitrosating higher molecular weight normal paraffins confirmed that at best only low yields and low selectivity to the corresponding oximes resulted. Moreover, from a commercial sense these processes were not only economically unattractive but impractical.

It is therefore an object of this invention to provide an effiicient process for the preparation of oximes from normal paraffins.

Another object of this invention is to provide a process for the preparation of oximes from normal paraffins in high yields.

Yet another object of this invention is to provide a process having high selectivity for the preparation of oximes from normal paraffins.

Other objects and advantages will become apparent from a reading of the following detailed description and examples.

Broadly, this invention contemplates a process for the manufacture of normal paraffin oximes which comprises:

(a) photochemically reacting in a light transmittable reaction vessel a normal paraffin having from 10 to 13 carbon atoms with a gaseous nitrosating agent, where said nitrosating agent partial pressure is at least 125 mm. Hg, and under the influence of light excluding wavelengths below 200 millimicrons,
(b) separating unreacted normal paraffin and the reaction products of (a),
(c) neutralizing said separated reaction products of (b), and
(d) separating and recovering normal paraffin oximes.

The paraffin hydrocarbons contemplated in this invention are straight chain aliphatic hydrocarbons containing at least 10 carbon atoms and particularly n-paraffins having from 10 to 13 carbon atoms. Such hydrocarbons include n-decane, n-undecane, n-dodecane, n-tridecane and mixtures thereof. Typical paraffin hydrocarbon mixtures applicable to this invention include hydrocarbon mixtures comprising 10 to 13 carbon atoms which are obtained from middle distillates by adsorption in molecular sieves.

Applicable nitrosation agents or components of nitrosating mixtures include, nitrosyl halides, nitrosyl sulfuric acid, hydrogen halides, halogens, nitrogen oxide, nitrogen peroxide, etc. Mixed nitrosating agents such as nitric oxide and chlorine are similarly contemplated in molar ratios, for example, ranging from 3:1 to about 1:1. The nitrosating agent may be diluted with hydrogen chloride, nitrogen, or other gases inert to the photolytic reaction. Mixtures of inert gases is also contemplated.

An important aspect of this invention relates to the concentration of nitrosating agent dissolved in the normal paraffin during the course of the reaction. The concentration, best expressed in terms of photonitrosating agent partial pressure, must be controlled within narrow limits so as to provide high oxime yield. It has been found that when the photochemical reaction is carried out under a partial pressure of nitrosating agent ranging from about 125 to 625 and preferably between 200 and 400 mm. Hg, high molar yields of oxime up to 92% and higher can be realized. Partial pressures below 125 mm. Hg and above 625 mm. Hg significantly reduced oxime formation.

In another embodiment related to the high conversion of normal paraffin to the corresponding oxime, the reaction is permitted to proceed under the influence of light of selected wavelengths influencing both oxime selectivity and yield. Investigations have shown that exclusion of wavelengths shorter than 200 millimicrons and preferably excluding wavelengths below 280 millimicrons materially alter the process and product formed thereby. Experiments conducted employing normal paraffins within the ranges stated above and nitrosyl chloride as reactants under the influence of unfiltered and filtered light, resulted in an oxime selectivity of only from 10 to 40 percent with unfiltered light, the remainder being primarily ketones. Where filtered light was employed, as contemplated in the instant invention, selectivity to the corresponding oxime was 93.5%. Moreover, filtered light not only materially affected selectivity but additionally and significantly affected yield. In the same experiment it was observed that oxime formation rate was approximately 50% greater under the influence of filtered light than under the influence of light permitting all wavelengths emitted from a mercury arc lamp to influence the reaction.

The filtered light may be provided to the reaction zone in a number of ways. For example various glasses capable of inhibiting the passage of undesired wavelengths may be employed, that is, the reaction walls may consist of such materials or a glass filter may be interposed between the light source and the reaction zone. Among the filtering glasses which may be employed we mention Pyrex 7740, Corning glass No.'s 0160, 7380, 3850 and Corex 9700 and in general those glasses inhibiting ultraviolet light transmission of wavelengths of below 200 millimicrons and preferably below 280 millimicrons.

Other methods for filtering light may also be utilized including the use of fluorescent materials which may be present for example in a heat exchanging zone conveniently positioned between the light source and the reaction zone. Among the applicable fluorescent materials we mention sodium and calcium salts of phenols and naphthols, and sulfonates of the same. The absorption of undesirable wavelengths may also be accomplished by interposing in light's path such other materials as aqueous ammonium or sodium nitrite, or plastics such as cellulose acetate or nitrate or an acrylic resinous material. Combinations of the above filtering techniques are similarly contemplated as for example Corex 9700 glass and aqueous sodium nitrite.

An additional embodiment further influencing yield and selectivity relates to the use of a polybasic acid such as sulfuric or phosphoric acid, flowing along the surface of the reaction vessel. Sulfuric acid has previously been suggested as a means for carrying out continuous reactions without the occurrence of deposits inhibiting the transmission of light. In the instant process, the filtering of wavelengths below 200 millimicrons and preferably below 280 millimicrons significantly prolongs the on-stream time before deposition interferes with light transmission and in turn with the reaction. We have found it beneficial to contemporaneously provide an intermittent or continuous flow of sulfuric or phosphoric acid over the reactor wall, particularly the light transmitting wall. Such flows have not only materially assisted in inhibiting by-product deposition on the reactor wall but have substantially influenced the course of the reaction. However, not all concentrations of sulfuric or phosphoric acid have been found to be beneficial when n-paraffins of the type described herein are employed. While the art has suggested, for example, that any sulfuric acid concentration over 4%, that is, dilute, concentrated or fuming sulfuric acid may be employed, we have found that only a concentrated sulfuric or phosphoric acid and particularly acids of from 85 to 98 percent, preferably 95 to 98 percent, are permissible in the instant process. Employing dilute acids i.e. 4 to 20 percent sulfuric acid, has prevented the photolysis reaction from occurring to a significant extent and in some instances no reaction at all took place. Fuming sulfuric acid on the other hand has suppressed oxime formation with resulting ketone and amide formation. Operable ranges stated above, which we term concentrated acids, surprisingly provide not only prolonged reactions free of optically interfering deposits but provide isolatable oximes. Further, when the concentrated acid flow is utilized in combination with filtered light, approximately 95 percent of the ultimate converted material consist of oximes, the remainder being predominantly ketones in the range of 3 to 5 percent.

In accordance with this invention the oxime is prepared by admixing a nitrosating agent such as a nitrosyl halide, particularly nitrosyl chloride and preferably with nitrogen and hydrogen chloride as diluent gases. The nitrosating agent is next contacted with $C_{10}$ to $C_{13}$ n-paraffin at a temperature ranging from about 32 to about 110° F., preferably between 50 and 80° F., in the presence of concentrated polybasic acid, preferably sulfuric acid, flowing along the reactor surface and actinic light excluding wavelengths below 200 millimicrons preferably excluding those below 280 millimicrons. In operation, the conversion product comprises approximately 95 percent of the n-paraffin oxime salts of hydrochloric acid along with approximately 4 percent of nitrosoalkyl chloride and approximately 0.2 percent of alkyl chloride. To achieve maximum light utilization the n-paraffin is exposed to a light source contained in a glass water-cooled immersion well. Under the operative conditions, oxime hydrochlorides precipitate to the bottom of the reaction vessel as an oily layer where they may be continuously removed. The oximes are subsequently sprung by neutralizing the oxime hydrochloride with aqueous ammonia, caustic soda or other base. In general, a typical apparatus consists of a reactor equipped with a quartz immersion well containing a mercury arc lamp fitted with a light filtering means intermittent the light source and the reaction zone whereby wavelengths of less than 200 millimicrons are precluded from influencing the reaction. In place of mercury arc lamps any source producing light in the wavelengths range of 200 to 760 millimicrons may be employed including xenon arc, thallium arc, sodium arc and the tungsten incandescent lamp. By filtering out wavelengths below 200 millimicrons, undesirable by-product deposition on the light source decreases while concomitantly increasing oxime yield.

Following the reaction, the reaction effluent is degased, preferably under vacuum, and any unreacted gaseous nitrosating agent is recovered and recycled to the reaction. During the photolytic reaction, concentrated sulfuric acid (85 to 98 percent) is continuously passed over the quartz well reaction surface thereby removing and inhibiting the build-up by-product deposition. Inasmuch as the well cleaning sulfuric acid reacts with the oxime hydrochlorides, nitrosoalkyl chlorides and alkyl chlorides to produce sulfuric acid reaction products, these products are subsequently released from their complex with sulfruic acid by first extracting the nitrosator effluent with a low boiling hydrocarbon such as cyclohexane, n-pentane, low petroleum ether or isoheptane, to remove unreacted n-paraffins. In continuous operations the unreacted paraffins are recycled to the nitrosator and the paraffin denuded effluent is thereafter contacted with aqueous ammonia or gaseous ammonia at a temperature ranging from about 32 to 140° F., preferably from about 60 to 110° F., thereby separating the oxime and an aqueous ammonium sulphate.

Approximately three volumes of cyclohexane or other low boiling hydrocarbon of the type mentioned above are mixed with the salts during neutralization to facilitate the separation of the oximes from the aqueous phase. Substantially all of the inorganic salts from neutralization are contained in the aqueous phase and additional water washing may be employed to remove the remainder of the inorganic salts. The cyclohexane phase from the neutralization reaction contains the oximes along with minor amounts of by-products. The oximes may be recovered by blotter filtration and evaporation of the hydrocarbon under reduced pressure. Where desired the hydrocarbon may be condensed and recycled for reintroduction to the extraction or neutralization stages.

Oximes produced in this manner from $C_{10}$ to $C_{13}$ n-paraffins are valuable as engine oil additives, anti-icing agents, fuels, rocket propellents, fungicides, herbicides, and insecticides and have application in such areas as pharmaceuticals, ore flotation, plastics and detergents. Moreover, the oximes may be hydrogenated to amines or converted to amides by Beckmann rearrangement as well as various other derivatives as by reaction with ethylene oxide to ethoxylates and with ethylene imine to ethaminates. Further, the oximes may be hydrolyzed to yield ketones which are in turn hydrogenated to yield secondary alcohols.

In the following examples the apparatus employed to photonitrosate $C_{10}$ and higher n-paraffins consisted of a 12 liter flask equipped with a quartz immersion well containing a 550 watt high pressure mercury arc lamp. The immersion well was water jacketed to provide cooling to the lamp. A glass tubing containing a terminal fritted glass gas dispersion tip was used to deliver reactant gases to the bottom of the immersion well. Product and acid layer removal was accomplished by pumping off from the bottom of the reactor. Cooling of the normal paraffin phase was accomplished by circulation through a laboratory condenser connected to a chilled water circulation pump. Unreacted vent gases were led to a caustic scrubber. A glass sparging ring located near the top of the immersion well was used to deliver a film of acid to the immersion well surface for cleaning purposes. Charging funnels were used to supply normal paraffins and fresh acid as needed. The sulfuric acid solution to be used for cleaning the immersion well surface was added to the reaction flask to a level just below the fritted glass dispersion tip and normal paraffins were then added to the vessel until the level reached the top of the mercury arc lamp. Cooling water to the immersion well jacket was started as well as circulation of the normal paraffin through its cooling loop after which the reaction vessel was wrapped with aluminum foil to provide an internal light reflecting surface. When the paraffins reached the desired operating temperature the mercury arc lamp was turned on and allowed to reach full operating intensity before introducing the nitrosating gas mixture. This mixture consisted of nitrosyl chloride, hydrogen chloride, and nitrogen in metered proportions. Circulation of the bottom acid layer through the glass sparging ring was then started and adjusted so to provide an even wash film on the immersion well. The reaction was terminated by turning off the mercury arc lamp and gases and allowing the oxime salts to precipitate completely. Examples utilizing filtered light employed a Pyrex 7740 glass tube of two millimeters thickness. Approximately 60 milliliters of 98 percent sulfuric acid per hour were sparged onto the immersion well surface at 30 minutes intervals for periods of 3 to 5 seconds. This was found sufficient to maintain an optically clean surface at all times. Sulfuric acid and oxime salts were removed from the reactor bottom and additional normal paraffins were dded to replace those used. By this means an efficient continuous reaction was afforded. Upon leaving the reactor the mixture of oxime salts and sulfuric acid was degassed by agitating under vacuum. During this operation the oxime hydrochlorides were converted to oxime sulfates and the liberated HCl was removed along with previously dissolved HCl and NOCl. Sufficient sulfuric acid was present on a 1:1 mole ratio to free the bound HCl so as to recover and recycle the HCl back to the reactor. Small amounts of normal paraffins, approximately 10 percent, entrained in the precipitating oxime salts was removed by extracting the degassed salts with cyclohexane and the n-paraffin was recovered for recycle by evaporation of the low boiling hydrocarbon solvent. The n-paraffin denuded extracted oxime salt was thereafter neutralized with aqueous ammonia. Approximately three volumes of cyclohexane was mixed with the salts during neutralization to facilitate separation of the oximes from the aqueous phase. The aqueous phase contained the inorganic salts from neutralization, ammonium sulfates, traces of ammonium chloride and additional water washing removed the remainder of the inorganic matter.

The figure graphically illustrates the relationship between the nitrosating agent partial pressure and oxime productivity. A series of runs employing HCl and nitrogen as diluents was made at constant NOCl charge rates and various partial pressures. The results are presented in the figure which is a plot of the rate of crude oxime formations as a function of NOCl partial pressure at each charge rate. Curve 1 represents an NOCl charge rate of 0.010 mole per minute. By varying the partial pressure of NOCl from 100 to 600 mm. Hg maximum oxime formation occurred between 200 to 300 mm. Hg partial pressure with operative limits of from 125 to 45 mm. Hg. Curve 2 represents an NOCl charge rate of 0.020 mole per minute where maximum oxime formation occurred between 300 to 400 mm. Hg partial pressure with operative limits of from 125 to 625 mm. Hg. Curve 3 represents an NOCl charge rate of 0.025 mole per minute where the maximum oxime formation and operative limits correspond to those of Curve 2.

Table I below summarizes the results obtained in the presence or absence of washing agent. The data below were obtained using unfiltered mercury arc radiation.

TABLE I.—EFFECT OF IMMERSION WELL WASHING AGENT AND UNFILTERED RADIATION

| Example | A | B | C | D | E | F |
|---|---|---|---|---|---|---|
| Washing agent | None | 98% $H_2SO_4$ (1.2 grams/min.) | 98% $H_2SO_4$ (3.0 grams/min.) | 5% $H_2SO_4$ | 20% $H_2SO_4$ | 20% $SO_3$ in $H_2SO_4$ |
| Run time (hours) | 2 | 10 | 48 | 7 | 5 | 3 |
| Remarks | Extensive tar deposition | Extensive tar deposition, product 10% oxime | Clean product 10% oxime | No reaction | No reaction | Product ketones and amides |

From the table it will be seen that it was not possible to operate longer than 2 hours without an immersion well washing agent. Further, dilute sulfuric acid or fuming sulfuric acid washing agents either produced no reaction or reactions culminating in products consisting of ketones and amides. Where concentrated sulfuric acid was employed as the washing agent, oxime products were recovered. Table II summarizes the effect of filtered light on product formation.

TABLE II.—EFFECT OF FILTERED LIGHT ON PRODUCT FORMATION

| Example | G | H | I | J |
|---|---|---|---|---|
| Washing agent | 98% $H_2SO_4$ | 98% $H_2SO_4$ | 98% $H_2SO_4$ | None |
| Filter | None | Pyrex glass | Pyrex glass | Pyrex glass |
| Average NOCl charge rate (mol./min.) | 0.020 | 0.010 | 0.020 | 0.020 |
| Average crude product rate (grams/min.) | 1.08 | 1.0 | 1.47 | 1.1 (initial)[1] 0.5 (final) |
| Selectivity | 60% ketone, 40% oxime | 94.5% oxime | 93.5% oxime | 90% oxime tar deposition |

[1] Rate declined as tar deposition increased.

From the examples above it can be seen that both product formation rate and selectivity were affected when light of preferred wavelengths, excluding wavelengths below 280 millimicrons was introduced into the reaction zone. Referring to Table II unfiltered light resulted in a crude product formation rate of about 1.0 gram per minute as can be seen from Example G. An equal level of productivity was achieved at half the NOCl charge rate with filtered radiation, see Example H. Further, the same NOCl charge rates resulted in a 50 percent oxime productivity increase as in Example I. The data in Table II also demonstrate that filtered radiation is necessary to achieve high reaction selectivity to oximes. Comparing Examples G, I and J ketones were produced as a major product in G whereas high oxime selectivity resulted when filtered radiation was applied in Examples I and J.

We claim:
1. A process for the manufacture of normal paraffin oximes which comprises:
    (a) photochemically reacting in a light transmittable reaction vessel or normal paraffin having from 10 to 13 carbon atoms with a gaseous nitrosating agent selected from the group consisting of nitrosyl halides, nitrosyl sulfuric acid, nitrogen oxide and chlorine, nitrogen peroxide and chlorine each alone and in admixture with hydrogen chloride, where said nitrosating agent partial pressure ranges from about 125 to 625 mm. Hg, and under the influence of light excluding wavelengths below 200 millimicrons, said light including wavelengths in the range of 200 to 760 millimicrons,
    (b) separating unreacted normal paraffin and the reaction products of (a),
    (c) neutralizing said separated reaction products of (b), and
    (d) separating and recovering normal paraffin oximes.
2. A process according to claim 1 wherein said nitrosating agent is nitrosyl chloride.
3. A process according to claim 1 wherein said nitrosating agent is mixed with gas inert to the reaction of (a).

4. A process according to claim 1 wherein said reaction is conducted at a temperature of from 32 to 110° F.

5. A process according to claim 1 wherein said light exludes wavelengths below 280 millimicrons.

6. A process according to claim 1 wherein said paraffin is a mixture of $C_{10}$ to $C_{13}$ n-paraffins.

7. A process according to claim 1 wherein said nitrosating agent partial pressure is from about 200 to 400 mm. Hg.

8. A process according to claim 1 wherein a concentrated polybasic acid at least intermittently flows over the reaction surface of said reaction vessel.

9. A process according to claim 8 wherein said polybasic acid is sulfuric acid.

10. A process according to claim 9 wherein said acid is from 85 to 98% sulfuric acid.

11. A process according to claim 8 wherein said polybasic acid is phosphoric acid.

12. A process according to claim 11 wherein said acid is from 85 to 98% phosphoric acid.

References Cited
UNITED STATES PATENTS

| | | | |
|---|---|---|---|
| Re. 25,937 | 12/1965 | Ito | 204—162 |
| 3,048,634 | 8/1962 | Mueller et al. | 204—162 |
| 3,090,739 | 5/1963 | Ito | 204—162 |
| 3,129,155 | 4/1964 | Ito et al. | 204—162 |
| 3,309,298 | 3/1967 | Ito et al. | 204—162 |

BENJAMIN R. PADGETT, Primary Examiner